US007212824B2

(12) United States Patent
Terry

(10) Patent No.: US 7,212,824 B2
(45) Date of Patent: May 1, 2007

(54) CHANNEL SWITCHING FOR SUPPORT OF MULTIMEDIA BROADCAST AND MULTICAST SERVICES

(75) Inventor: Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 259 days.

(21) Appl. No.: 10/637,022

(22) Filed: Aug. 7, 2003

(65) Prior Publication Data

US 2004/0116125 A1    Jun. 17, 2004

Related U.S. Application Data

(60) Provisional application No. 60/402,161, filed on Aug. 7, 2002.

(51) Int. Cl.
*H04Q 7/20* (2006.01)
(52) U.S. Cl. .................. 455/450; 455/414.1; 455/436; 370/331
(58) Field of Classification Search .............. 455/452.1, 455/452.2, 453, 450, 435.1, 436, 512, 522, 455/69, 3.06; 370/329, 347, 437, 336, 229, 370/431, 238, 328, 331
See application file for complete search history.

(56) References Cited

U.S. PATENT DOCUMENTS

| 5,475,861 | A | 12/1995 | Hall |
| 5,592,471 | A | 1/1997 | Briskman |
| 5,920,817 | A | 7/1999 | Umeda et al. |
| 6,349,210 | B1 | 2/2002 | Li |
| 6,760,303 | B1* | 7/2004 | Brouwer ..................... 370/229 |
| 2002/0085516 | A1 | 7/2002 | Bridgelall |
| 2003/0012217 | A1* | 1/2003 | Andersson et al. ......... 370/437 |
| 2003/0033253 | A1 | 2/2003 | Rhodes |
| 2003/0073453 | A1* | 4/2003 | Basilier ...................... 455/503 |
| 2003/0096619 | A1* | 5/2003 | Winberg ..................... 455/453 |
| 2003/0207696 | A1* | 11/2003 | Willenegger et al. ....... 455/522 |
| 2003/0223394 | A1* | 12/2003 | Parantainen et al. ........ 370/336 |
| 2004/0131075 | A1* | 7/2004 | Sinnarajah et al. ......... 370/431 |
| 2005/0085182 | A1* | 4/2005 | Chuberre et al. .......... 455/3.01 |

FOREIGN PATENT DOCUMENTS

CN          1340932 A         3/2002

(Continued)

OTHER PUBLICATIONS

Presentation of Specification to TSG or WG, TS 25.345 Version 2.0.0, RP-030309, TSG-RAN meeting #20, Hämeenlinna, Finland, 3rd-6th (Jun. 2003).

(Continued)

*Primary Examiner*—Jean Gelin
(74) *Attorney, Agent, or Firm*—Volpe and Koenig, P.C.

(57) ABSTRACT

The present invention includes a radio access network and a method for sending a multimedia broadcasts/multicast services (MBMS) using channel switching. The channel switching is between dedicated and shared/common channels. The invention also includes MBMS reception scheduling for use when a wireless transmit/receive device receives an MBMS service from multiple transmission sources. The sources transmitting the MBMS service data in differing orders. One embodiment uses in band segmentation information and another embodiment uses out of band synchronization information.

10 Claims, 3 Drawing Sheets

FOREIGN PATENT DOCUMENTS

| | | |
|---|---|---|
| CN | 1340932 A | 3/2002 |
| JP | 11-041186 | 2/1999 |
| JP | 2000-138966 | 5/2000 |
| JP | 2002-165262 | 6/2002 |
| JP | 2002-259807 | 9/2002 |
| JP | 2003-069491 | 3/2003 |
| KR | 2001-42426 | 5/2001 |
| KR | 2002025132 A | 4/2002 |
| KR | 2002025132 A | 4/2002 |
| RU | 2257674 | 7/2005 |
| RU | 2258311 | 8/2005 |
| RU | 2262196 | 10/2005 |
| RU | 2262811 | 10/2005 |
| WO | 01/99461 | 12/2001 |
| WO | 0199461 A | 12/2001 |
| WO | 02/32178 A | 4/2002 |
| WO | 0232178 A | 4/2002 |

OTHER PUBLICATIONS

3GPP TS 25.346 V2.0.0; Technical Specification Group Radio Access Network; Introduction of the Multimedia Broadcast Multicast Service (MBMS) in the Radio Access Network (Stage-2) (Release 6); 3rd Generation Partnership Project (Jun. 2003).

3GPP TS 25.cde v0.0.1; Technical Specification Group Radio Access Network; Introduction of the Multimedia Broadcast Multicast Service (MBMS) in RAN; (Release 6); 3rd Generation Partnership Project (May 2005).

Presentation of Specification to TSG or WG, TS 25.345, Version 2.0.0, RP-030309, TSG-RAN meeting #20, Hämeenlinna, Finland, 3rd-6th (Jun. 2003).

3GPP TS 25.346 V2.0.0; Technical Specification Group Radio Access Network; Introduction of the Multimedia Broadcast Multicast Service (MBMS) in the Radio Access Network (Stage-2) (Release 6); 3rd Generation Partnership Project (Jun. 2003).

3GPP TS 25.cde v0.0.1; Technical Specification Group Radio Access Network; Introduction of the Multimedia Broadcast Multicast Service (MBMS) in RAN; (Release 6); 3rd Generation Partnership Project (May 2005).

* cited by examiner

CHANNEL SWITCHING FOR SUPPORT OF MULTIMEDIA BROADCAST AND MULTICAST SERVICES

CROSS REFERENCE TO RELATED APPLICATION(S)

This application claims priority from U.S. provisional application No. 60/402,161 which was filed on Aug. 7, 2002, which is incorporated by reference as if fully set forth.

FIELD OF INVENTION

The present invention generally relates to wireless communication systems. In particular, the present invention relates to channel switching and scheduling of multimedia broadcasts and multicast services in such systems.

BACKGROUND

There is a growing desire to use multimedia broadcasts/multicast services (MBMS) in wireless communication systems. For a particular MBMS, a given cell in the network may have none, one or multiple users, wireless transmit/receive units (WTRUs), subscribed to that MBMS. As users migrate between cells, a cell that may originally have one or no users subscribed to the service may at a later point have multiple subscribed users. Conversely, a cell that may at one point have multiple subscribed users may at another time have only one or no users.

This migration of the users can create inefficient use of radio resource. If only one or a few users are subscribed to the MBMS in the cell, it may be desirable to support the service using dedicated channels to the users. The dedicated channels can utilize power control and beam steering to reduce the amount of radio resources utilized to support the MBMS.

However, if many users are subscribed to the MBMS in the cell, the multiple dedicated channels in total may use considerable radio resources. In such a situation, a more optimal use of the radio resources may be to send the MBMS data over a common/shared channel to a set of users subscribed to that MBMS. Although the use of beamsteering and power control in such situations is limited, the reduction in the number of total channels may reduce the used radio resources. As the number of MBMS users in the cell changes, an original choice of using either a common/shared channel or a dedicated channel may not be optimal at a later time.

Another potential problem resulting from user migration is MBMS scheduling. As a MBMS user moves between cells, that user needs to reconstruct the MBMS service from information received from both cells. If both cells synchronize their MBMS transmissions, the MBMS user can seamlessly move between the cells. However, such a scenario is typically not practical and undesirable. At certain time intervals based on the cell's loading and available resources, a cell may have more available resources to support the MBMS transmission than at another time. As a result, at that time, it is desirable for that cell to transmit a large amount of the MBMS data. For another cell at that same time interval, resources to support the same MBMS bandwidth may not be available. As a result, it may be desirable to schedule the MBMS transmissions differently between the cells, to better utilize such resources. As the MBMS user moves between cells, the new cell that the user has moved into may have transmissions either ahead or behind the other cell's transmissions. As a result, the MBMS user may miss MBMS data or needlessly receive redundant MBMS data.

Accordingly, it is desirable to have better resource utilization for MBMS.

SUMMARY

The present invention includes a radio access network and a method for sending a multimedia broadcasts/multicast services (MBMS) using channel switching. The channel switching is between dedicated and shared/common channels. The invention also includes MBMS reception scheduling for use when a wireless transmit/receive device receives an MBMS service from multiple transmission sources. The sources transmitting the MBMS service data in differing orders. One embodiment uses in band segmentation information and another embodiment uses out of band synchronization information.

BRIEF DESCRIPTION OF THE DRAWING(S)

DETAILED DESCRIPTION OF THE PREFERRED EMBODIMENT(S)

Although the preferred embodiments are described in conjunction with a third generation partnership program (3GPP) wideband code division multiple access (W-CDMA) system, the embodiments are applicable to any wireless system using MBMS. Hereafter, a wireless transmit/receive unit (WTRU) includes but is not limited to a user equipment, mobile station, fixed or mobile subscriber unit, pager, or any other type of device capable of operating in a wireless environment.

Figure 1:
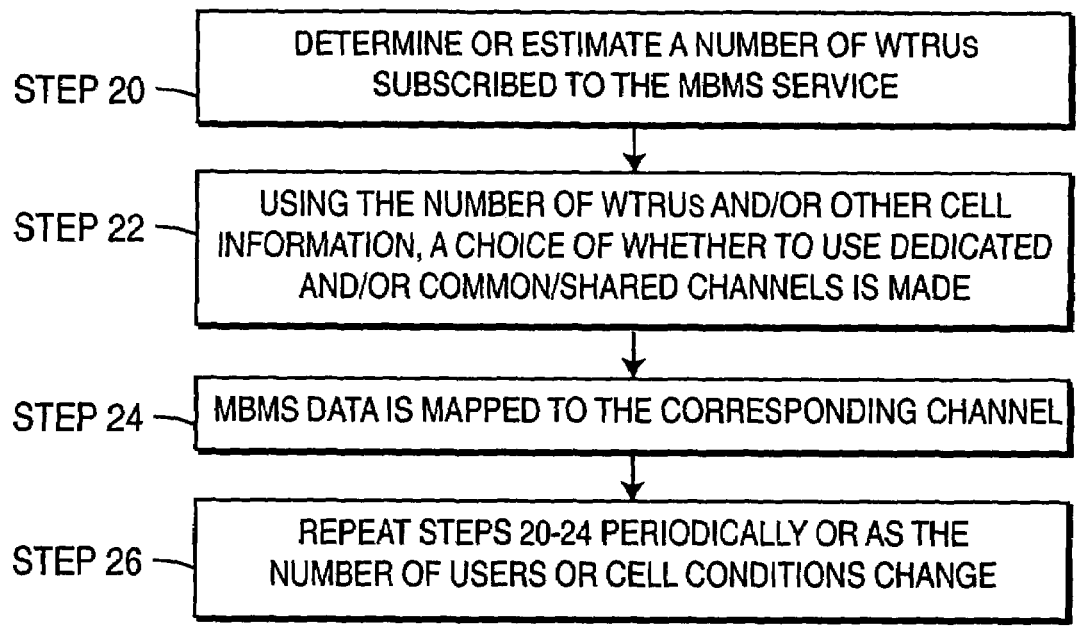
FIG. 1 is a flow chart for use in MBMS channel switching.

FIG. 1 is a flow chart for channel switching for a MBMS. In a particular cell, the number of WTRUs subscribed to the service is determined or estimated, step 20. Typically, this information is known. Using the number of WTRUs in the cell and/or other cell information, such as information on cell conditions, available cell resources, etc., a choice of whether dedicated channels, a common/shared channel or both are used, step 22. After the channel choice is made, the MBMS data is mapped to the corresponding channel(s), step 24. One possible approach to determine which type(s) of channels should be used is a threshold test. If below a certain threshold number of WTRUs is in the cell, dedicated channels are used. The dedicated channels allow for power control and transmit diversity techniques to be employed. These techniques are highly desirable when high data rate MBMS transfers are made, to efficiently use the available resources.

If the number of WTRUs exceeds the threshold, a common/shared channel is used, such as a shared channel, a high speed shared channel or a secondary common control physical channel (S-CCPCH). A shared channel or high speed shared channel can be used to transfer the MBMS data to multiple WTRUs simultaneously. The S-CCPCH can be used to broadcast the MBMS data to multiple users. Typically, the shared/common channels are less radio resource efficient.

In an alternate embodiment, a two threshold scheme may be used. If the number of MBMS subscribed WTRUs in the cell is below a first threshold, dedicated channels are used. If the number is between a first and second threshold, a shared or high speed shared channel is used. If the number exceeds the second threshold, a common channel is used to broadcast the MBMS.

Under certain circumstances, it may be desirable to use both shared and dedicated channels to support an MBMS. To illustrate, many subscribing WRTUs may be located together, such as at a train station, and a few or a single WTRU may be outside of the train station. In such a situation, the most efficient use of cell resources to support the MBMS may be to allocate a shared channel to the train station WTRUs and a dedicated channel to the other WTRU. As the number of users in a cell changes, the cell conditions changes or periodically, the channel choice is repeated using the new information, step 26.

Figure 2:
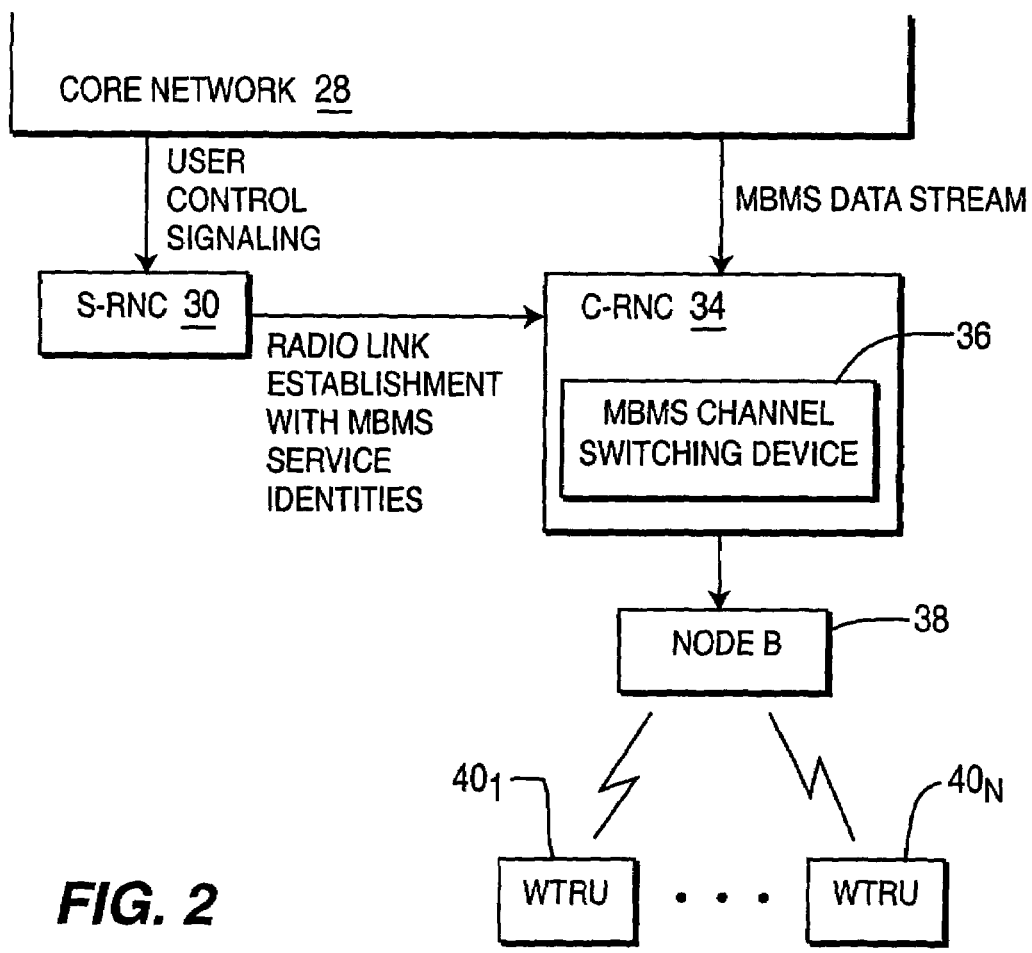
FIG. 2 is a radio access network using MBMS channel switching.

FIG. 2 is an illustration of a preferred radio access network (RAN) for performing channel switching. The RAN is managed by a serving radio network controllers (S-RNC) 30 which manages the user's services and the controlling radio network controller (C-RNC) 34 which manages the physical resources of the cells. Signaling procedures which provide the coordination needed between the S-RNCs 30 and the C-RNCs 34 for proper operation of the RAN are utilized.

A channel switching entity (MBMS channel switching device 36) determines which channels to use, such as dedicated, shared or the common, for MBMS transmission and it also coordinates reception of the MBMS with the WTRUs $40_1$ to $40_N$ (40). The MBMS data is sent to the WTRUs 40 via the Node-B 38.

A preferred implementation of the channel switching is as follows. A first WTRU 40 subscribed to the MBMS can enter and exit cells autonomously with respect to the activation and distribution of the MBMS service. When the MBMS is first established for the first WTRU 40 or a small number of users within a particular cell, dedicated channels are established with a unique radio link (RL) indicator that identifies the MBMS service. A second WTRU 40 that wishes to utilize another MBMS will have a different dedicated channel assigned to that user. When the RL is established for each user, a unique MBMS indicator is signaled from the S-RNC 30 to the C-RNC 34. This MBMS indicator is unique to each service provided to the user. The C-RNC 34 maintains a database of all users currently active for a particular MBMS service and this group is known as the MBMS user group.

The data for each active MBMS service is distributed to the C-RNC 34 from the core network 28 via the MBMS data stream. A unique identifier is associated with each MBMS data stream allowing the C-RNC 34 to associate the data with the appropriate user or user group so the data can be properly routed. Depending on the number of active users for a particular MBMS service and cell conditions, the C-RNC 34 will determine if the service should be transmitted on dedicated or shared/common channels.

Since individual users autonomously enter and exit the cell, the switching between dedicated and common channels is dynamic and may occur during ongoing transmissions. Dynamic switching can be applied to the downlink shared channels (DSCH). Data can be sent on the DSCH to be received by a single user is referred to as dedicated DSCH (D-DSCH) or by multiple users simultaneously is referred to as common DSCH (C-DSCH). For a particular MBMS when there is only one user or a small number of users existing within the cell, the DSCH will be a D-DSCH to the user or users. When the number of users associated with a particular MBMS increases, a C-DSCH can be established for this MBMS user group.

When the first WTRU 40 becomes active within the cell, a D-DSCH is established to this first user. The MBMS transmission may not necessarily be continuously active. The transmission of the MBMS on the DSCH is indicated to the first WTRU 40 on an associated dedicated channel. This indication may be turned on and off on a transmission time interval (TTI) basis.

The C-DSCH may be physically identical to the D-DSCH. However, a distinguishing characteristic is that the signaling for the DSCH transmission for the individual user associated with a dedicated channel within the MBMS user group is that the transmission is synchronized. This allows all users in the MBMS user group to receive the common DSCH transmission. An indication may be signaled along with MBMS transmissions to indicate that the MBMS transmission is either dedicated to a particular user or common to the users in the MBMS user group. This allows for proper operation of power control techniques, transmit diversity or any other unique physical transmission attributes. The MBMS transitions between dedicated and common DSCH is preferably transparent to the WTRU 40.

In another embodiment, the channel switching is applied to the high speed DSCH (HS-DSCH). A difference between using the HS-DSCH instead of the DSCH is that rather than applying synchronized allocations in the C-RNC 34 on the associated dedicated channels, the synchronized allocations are provided on HS-DSCH control channels in Node-B 38.

In another embodiment, switching may be performed between the dedicated physical channels and common physical channels without the use of the associated dedicated channels. The channel switching between the dedicated channels to the common channels is explicitly signaled to each user. The RAN layer 3 protocols allow for procedures of signaling the radio frame to transition between the dedicated and the common channels. The signaling is performed by either signaling a radio frame for the transition or by signaling the transmission scheduling information.

Figure 3:
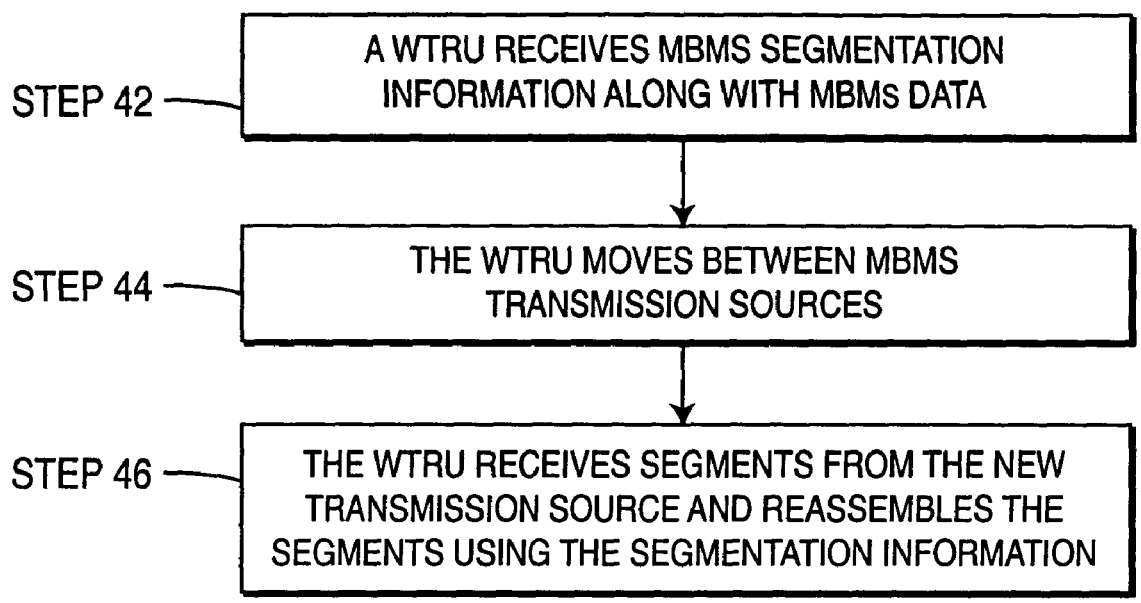
FIG. 3 is a flow chart for coordinating reception of a MSMS transmissions from multiple sources using in band segmentation information.
Figure 4:
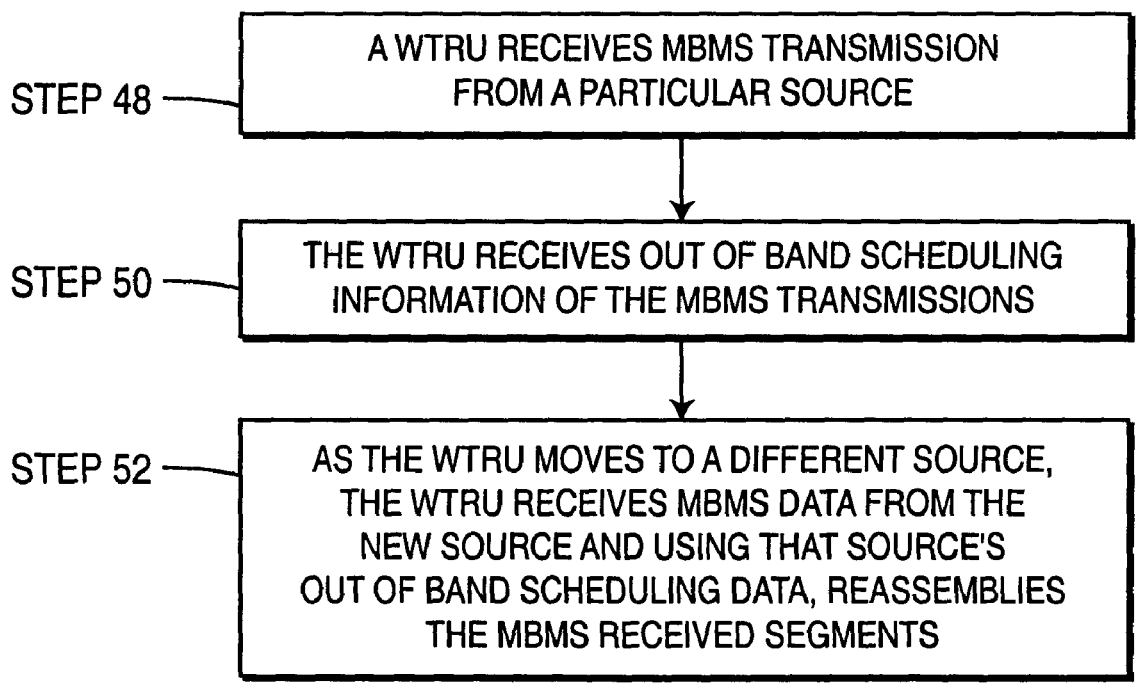
FIG. 4 is a flow chart for coordinating reception of a MSMS transmissions from multiple sources using out of band segmentation information.

FIGS. 3 and 4 are flow charts to allow for different cells and different inter-cell MBMS transmissions to be scheduled in different orders. To illustrate, a first cell may be able to transmit large amounts of MBMS data to WTRUs 40 in a radio frame that a second cell can not. As a result, MBMS transmission in the first cell may be one or multiple radio frames or TTIs ahead of the second cell.

To illustrate for inter-cell, within a cell, one group of users may be located in a train station and serviced by a common DSCH and another user within the same cell may be outside of the train station and be serviced by a dedicated channel or dedicated DSCH to take full advantage of beam forming and power control. Based on the DSCH loading and other factors, it may be desirable for transmissions to the train station WTRUs 40 to either lead or lag the outside WTRU transmissions. If a user of the outside WTRU 40 goes to the train station, it would most likely be desirable to switch that WTRU 40 to the common DSCH and disestablish the dedicated channel. In this scenario, the outside WTRU 40 may need to catch up to the transmissions on the common DSCH or allow those transmissions to catch up to the segments that the WTRU 40 already received.

To maintain continuous service distribution and make more efficient use of radio resources, the MBMS transmissions are preferably either segmented or scheduled so that users can receive elements of an MBMS service transmission in any order. As a result, the MBMS service transmissions do not have to be reinitiated in a cell upon a user entry to that cell or the user does not have to wait to synchronize with an existing MBMS service transmission.

FIG. 3 is a flow chart for using in-band segmentation information to handle differing MBMS transmission orders either inter-cell or between cells. Along with the MBMS transmissions, segmentation information is sent along with the MBMS data, step 42. This segmentation information typically includes a segment identifier so that each receiving WTRU is aware of which segments that it has received. As a particular WTRU moves between MBMS transmission sources (between cells or switched channels), step 44, the WTRU can receive segments from the new MBMS source and reassemble the transmissions to recovery all the MBMS data, step 46.

Figure 5:
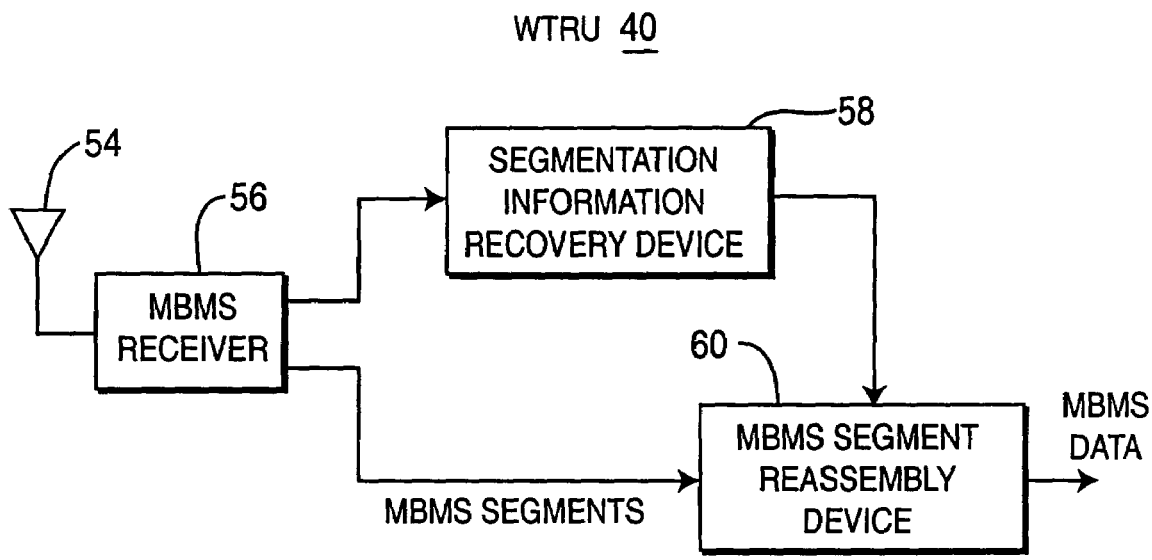
FIG. 5 is a WTRU for receiving MBMS information using in band segmentation information.

FIG. 5 is a simplified block diagram of a WTRU 40 for receiving the differing MBMS transmissions. The WTRU 40 receives the MBMS transmissions using an antenna 54. A MBMS receiver 56 receives the MBMS transmissions from the differing transmission sources, including the in band segmentation information. A segmentation information recovery device 58 recovers the segmentation information. Using the segmentation information and received MBMS segments, a MBMS segmentation reassembly device 60 reassembles the segments to recover the MBMS data.

FIG. 4 is a flow chart for using out of band transmission scheduling information to handle differing MBMS transmission orders. A WTRU receives a MBMS transmission from a particular source, step 48. The WTRU also receives out of band scheduling information, step 50. As the WTRU moves to a different source, the WTRU can receive MBMS data from the new source and using that source's out of band scheduling data reassemble the MBMS received segments, step 52.

Figure 6:
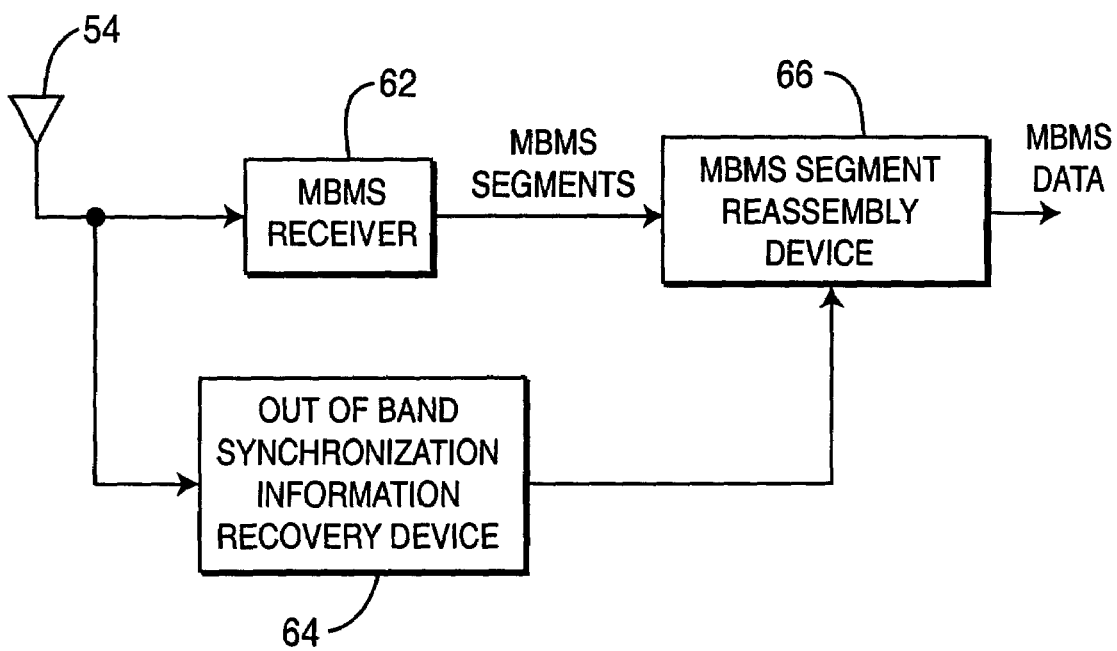
FIG. 6 is a WTRU for receiving MBMS information using out of band synchronization information.

FIG. 6 is a simplified block diagram of a WTRU 40 for receiving the differing MBMS transmissions. The WTRU 40 receives the MBMS transmissions using an antenna 54. A MBMS receiver 64 receives the MBMS transmissions from the differing transmission sources. An out of band synchronization information device 62 receives synchronization information from the multiple transmission sources. Using the synchronization information and received MBMS segments, a MBMS segmentation reassembly device 66 reassembles the segments to recover the MBMS data.

Both the approaches of FIG. 3 and 4 allow for users existing within the cell to just transition between dedicated and common channels without interruption or delay in the MBMS transmission. Additionally, WTRUs entering the cell can maintain continuous reception of the MBMS service, even though the sequence of transmission between the new and old cell are different. Once MBMS transmission data is received the WTRU reorders the information according to the in band segmentation and/or out of band transmission scheduling information.

Since either in band segmentation or out of band scheduling is provided, lost or failed transmissions can be efficiently recovered by the WTRU's knowledge of when retransmission is expected. The RNC MBMS retransmission scheduling can also be reduced by taking into account intelligent reception by the WTRUs. To illustrate, if the RNC knows all the users have received a particular MBMS segment, retransmission of that segment can be prevented.

What is claimed is:

1. A method for transferring multimedia broadcasts/multicast services (MBMS) in a wireless communication system, the method comprising:

determining a number of users in a cell to receive the MBMS;

using the determined number of users to determine whether a dedicated channel or a shared/common channel is to be used for the MBMS;

receiving MBMS data; and mapping the MBMS data to the determined dedicated or shared/common channel; and wherein the determined dedicated or shared/common channel is based on a threshold test where if the determined number of users is below the threshold, a dedicated channel is used for the MBMS and if the determined number of users is above the threshold, a shared/common channel is used for the MBMS; and wherein the threshold test has the threshold and a second threshold and if the determined number of users is above the second threshold, a common channel is used for the MBMS and if the determined number is between the threshold and the second threshold, a shared channel is used for the MBMS.

2. A method for transferring multimedia broadcasts/multicast services (MBMS) in a wireless communication system, the method comprising:

receiving MBMS data;

transmitting the MBMS data from a first MBMS transmitting source to a wireless transmit/receive unit (WTRU) along with segmentation information;

the WTRU receiving the MBMS data and the segmentation information from the first MBMS transmitting source;

the WTRU moving from the first MBMS transmitting source to a second MBMS transmitting source and receiving the MBMS data and segmentation information from the second source, the MBMS data from the first MBMS transmitting source and the second MBMS transmitting source being unsynchronized; and the WTRU reassembling the MBMS data using the first and second MBMS transmitter source segmentation information.

3. A method for transferring multimedia broadcasts/multicast services (MBMS) in a wireless communication system, the method comprising:

receiving MBMS data;

transmitting the MBMS data from a first MBMS transmitting source to a wireless transmit/receive unit (WTRU) and out of band scheduling information;

the WTRU receiving the MBMS data from the first MBMS transmitting source and the out of band scheduling information;

the WTRU moving from the first MBMS transmitting source to a second MBMS transmitting source and receiving the MBMS data from the second source, the MBMS data from the first MBMS transmitting source and the second MBMS transmitting source being unsynchronized; and the WTRU reassembling the MBMS data using the first and second transmitter source scheduling information.

4. A wireless transmit/receive unit (WTRU) for receiving a multimedia broadcasts/multicast services (MBMS) from a plurality of unsynchronized transmitting sources at differing times, the plurality of transmitting sources transmitting the MBMS data in an unsynchronized manner, the WTRU comprising:
- a MBMS receiver for receiving MBMS segments from each of the transmitting sources;
- a segmentation information recovery device for receiving segmentation information transmitted in band with the MBMS segments; and
- a MBMS segmentation reassembly device for reassembling the MBMS segments based on the segmentation information.

5. The WTRU of claim 4 wherein the plurality of transmitting sources transmit the MBMS data over secondary common control physical channels (S-CCPCH) and the MBMS receiver receives the MBMS segments over the S-CCPCHs.

6. The WTRU of claim 5 wherein the MBMS receiver is also configurable to receive the MBMS segments over a dedicated channel.

7. A wireless transmit/receive unit (WTRU) for receiving a multimedia broadcasts/multicast services (MBMS) from a plurality of unsynchronized transmitting sources, the plurality of transmitting sources transmitting the MBMS data in an unsynchronized manner, the WTRU comprising:
- a MBMS receiver for receiving MBMS segment from each of the transmitting sources;
- a out of band synchronization information receiver for receiving out of band synchronization information from each of the transmitting sources;

a MBMS segmentation reassembly device for reassembling the MBMS segments based on the synchronization information.

8. A user equipment comprising:
- a multimedia broadcast/multicast service (MBMS) receiver, in response to received signaling, to receive MBMS data segments of an MBMS service over a dedicated physical channel or a secondary common control physical channel, wherein the received MBMS segments originate from a plurality of cells transmitting the MBMS segments such that one of the plurality of cells is transmitting the MBMS segments ahead of at least one other of the plurality of cells; and
- a MBMS segment reassembly device configured to reassembly the received MBMS segments from the plurality of cells in response to segmentation information transmitted with the MBMS segments.

9. The user equipment of claim 8 wherein the one of the plurality of cells is at least one radio frame time difference to the at least one other of the plurality of cells and the MBMS segment reassembly device reassembles the segments transmitted with at least one radio frame time difference.

10. The user equipment of claim 8 wherein the one of the plurality of cells is at least one TTI time difference to the at least one other of the plurality of cells and the MBMS segment reassembly device reassembles the segments transmitted with at least one TTI time difference.

* * * * *

UNITED STATES PATENT AND TRADEMARK OFFICE
CERTIFICATE OF CORRECTION

PATENT NO. : 7,212,824 B2 Page 1 of 1
APPLICATION NO. : 10/637022
DATED : May 1, 2007
INVENTOR(S) : Stephen E. Terry It is certified that error appears in the above-identified patent and that said Letters Patent is hereby corrected as shown below:

IN THE DRAWINGS

At FIG. 3, STEP 42, line 2, after the word "WITH", delete "MBMs" and insert therefor --MBMS--.

At FIG. 4, STEP 52, line 4, after the word "DATA", delete "REASSEMBLIES" and insert therefor --REASSEMBLES--.

IN THE SPECIFICATION

Column 2, line 25, after the words "reception of", delete "a".

Column 2, line 28, after the words "reception of", delete "a".

Column 2, line 59, before the words "in the", delete "is" and insert therefor --are--.

Column 3, line 27, after the word "network", delete "controllers" and insert therefore --controller--.

Column 4, line 3, before the word "referred", delete "is".

IN THE CLAIMS

Column 8, lines 12 & 13, after the words "configured to", delete "reassembly" and insert therefore --reassemble--.

Signed and Sealed this

Eighteenth Day of March, 2008

JON W. DUDAS
*Director of the United States Patent and Trademark Office*